(12) United States Patent
Grever et al.

(10) Patent No.: US 12,736,349 B2
(45) Date of Patent: Sep. 15, 2026

(54) METHOD FOR ROUTE PLANNING

(71) Applicant: MASCHINENFABRIK BERNARD KRONE GMBH & CO. KG, Spelle (DE)

(72) Inventors: Alexander Grever, Osnabrueck (DE); Christian Schroeer, Neuenkirchen (DE)

(73) Assignee: MASCHINENFABRIK BERNARD KRONE GMBH & CO. KG, Spelle (DE)

( * ) Notice: Subject to any disclaimer, the term of this patent is extended or adjusted under 35 U.S.C. 154(b) by 94 days.

(21) Appl. No.: 18/764,414

(22) Filed: Jul. 5, 2024

(65) Prior Publication Data

US 2025/0020468 A1 Jan. 16, 2025

(30) Foreign Application Priority Data

Jul. 14, 2023 (DE) ..................... 10 2023 118 716.3

(51) Int. Cl.
*G01C 21/20* (2006.01)
*A01D 41/127* (2006.01)

(52) U.S. Cl.
CPC ......... *G01C 21/20* (2013.01); *A01D 41/1278* (2013.01)

(58) Field of Classification Search
CPC .. G01C 21/20; A01D 41/1278; A01B 69/008; G05D 2105/15; G05D 2107/21; G05D 2109/10; G05D 1/2297; G05D 1/6484
See application file for complete search history.

(56) References Cited

U.S. PATENT DOCUMENTS 12,029,156 B1 * 7/2024 Simpson .............. A01D 34/008
12,213,394 B2 * 2/2025 Tamatani ............. A01B 69/008
12,336,445 B2 * 6/2025 Morimoto .............. G05D 1/648
2018/0156622 A1 * 6/2018 Mouthaan .......... G01C 21/3407
2018/0359905 A1 * 12/2018 Foster .................. G05D 1/0219
2019/0353483 A1 * 11/2019 Liu ...................... A01B 69/008
(Continued)

FOREIGN PATENT DOCUMENTS

CN 111343853 A 6/2020
JP 2022-173643 A 11/2022
WO WO 2022/244435 A1 11/2022

*Primary Examiner* — Abdalla A Khaled
(74) *Attorney, Agent, or Firm* — Norman B. Thot

(57) ABSTRACT

A method for a route planning for a field processing. The method includes passing an agricultural machine through a primary area of a processing area while automatically determining position data thereof, at least partially automatically determining a primary boundary which surrounds the primary area based on the position data, determining a secondary outer boundary of a secondary area, the secondary outer boundary being arranged outside the primary area to meet the primary boundary at connection points, automatically determining a driving route for processing at least the secondary area, and automatically generating control data for controlling the agricultural machine during the field processing. A part of the primary boundary which lies between the two connection points forms an inner boundary between the primary area and the secondary area. The inner boundary, together with the secondary outer boundary, completely surrounds the secondary area. The control data represents a determined driving route.

16 Claims, 6 Drawing Sheets

(56) References Cited

U.S. PATENT DOCUMENTS

2021/0146995 A1* 5/2021 Miyashita ............ B62D 15/025
2023/0255129 A1* 8/2023 Takahashi .............. G05D 1/646
701/50
2023/0380327 A1* 11/2023 Kuboshima .......... A01B 69/008
2024/0040961 A1* 2/2024 Cong ................... A01B 69/008
2024/0062433 A1* 2/2024 Monday ............... A01B 79/005
2024/0081167 A1* 3/2024 Morimoto ............ G05D 1/0212
2024/0324488 A1* 10/2024 Kikuchi ................. A01B 69/00
2024/0334861 A1* 10/2024 Kuboshima .............. B60Q 9/00
2024/0345253 A1* 10/2024 Matsuzaki ........... A01B 69/008
2025/0008858 A1* 1/2025 Morimoto .............. A01B 69/00
2025/0374847 A1* 12/2025 Morimoto ............ A01B 69/008

* cited by examiner

METHOD FOR ROUTE PLANNING

CROSS REFERENCE TO PRIOR APPLICATIONS

Priority is claimed to German Patent Application No. DE 10 2023 118 716.3, filed Jul. 14, 2023. The entire disclosure of said application is incorporated by reference herein.

FIELD

The present invention relates to a method for route planning, to a computer system for route planning, to an agricultural machine, and to a computer program product.

BACKGROUND

When cultivating an agricultural area, for example, a given processing area, an agricultural machine gradually covers the entire area in several lanes. In an inner area, for example, parallel lanes can be used. To change between the parallel lanes, turning paths are required, which are passed through in a headland located at the edge of the inner area. In the case of a harvesting machine, for example, a combine harvester or forage harvester, the headland is usually processed first, i.e., harvested, followed by the inner area. This avoids unnecessarily driving over unprocessed crops in the headland. It is generally known to plan a route for a processing area with known dimensions, which can then be passed through either manually or at least partially autonomously by the agricultural machine. Working a field with unknown dimensions, which regularly occurs in practice, however, poses a particular challenge. The necessary information for route planning is initially missing in this case.

SUMMARY

An aspect of the present invention is to provide for an efficient agricultural processing of an unknown processing area.

In an embodiment, the present invention provides a method for a route planning for a field processing where an agricultural machine processes a processing area. The method includes passing the agricultural machine in a manually controlled manner through a primary area of the processing area while automatically determining position data of the agricultural machine, at least partially automatically determining a primary boundary which surrounds the primary area based on the position data, determining a secondary outer boundary of a secondary area, the secondary outer boundary being arranged outside the primary area so as to meet the primary boundary at two connection points, automatically determining a driving route for processing at least the secondary area, automatically generating control data for controlling the agricultural machine during the field processing, and applying the method for the route planning for the field processing so that the agricultural machine processes the processing area. A part of the primary boundary which lies between the two connection points forms an inner boundary between the primary area and the secondary area. The inner boundary, together with the secondary outer boundary, completely surrounds the secondary area. The control data represents a determined driving route.

BRIEF DESCRIPTION OF THE DRAWINGS

The present invention is described in greater detail below on the basis of embodiments and of the drawings in which.

DETAILED DESCRIPTION

Figure 1:
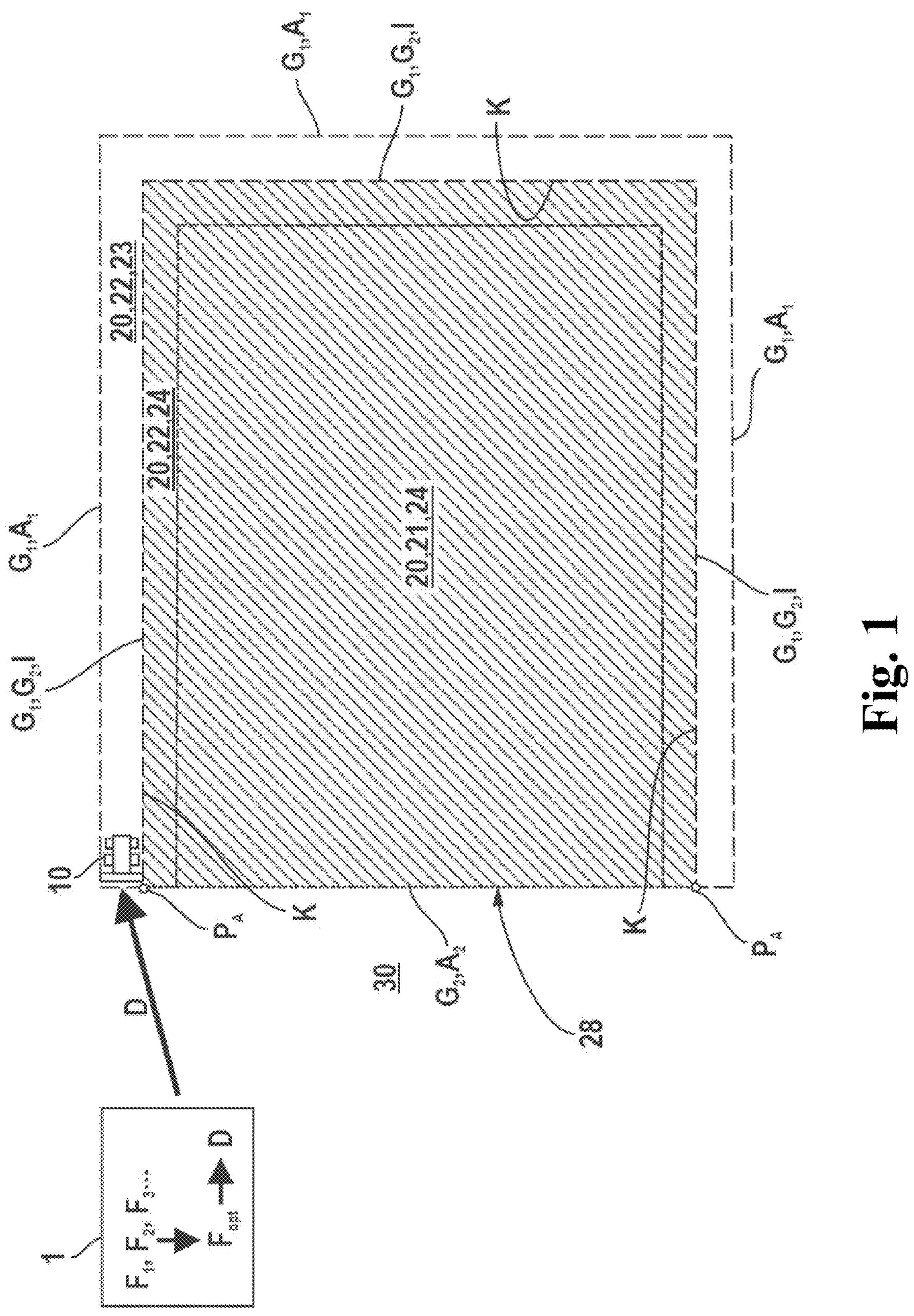
FIG. 1 shows a top view of a first processing area, of an agricultural machine, and of a computer system according to the present invention for route planning during a first phase of a method according to the present invention.

The present invention provides a method for route planning for a field processing in which an agricultural machine processes a processing area, whereby:

- a primary area of the processing area is passed through by the agricultural machine under manual control, whereby the position data of the agricultural machine is automatically determined,
- a primary boundary surrounding the primary area is at least partially determined automatically based on the position data,
- a secondary outer boundary of a secondary area, which is arranged outside the primary area and meets the primary boundary at two connection points, is defined, a part of the primary boundary lying between the connection points forming an inner boundary between the primary area and the secondary area which, together with the secondary outer boundary, completely surrounds the secondary area,
- a route for processing at least the secondary area is automatically determined, and
- control data for controlling the agricultural machine during field processing are automatically generated, whereby the control data represent a determined driving route.

The method is intended for route planning for field processing in which an agricultural machine processes a processing area. The agricultural machine can also be referred to as an agricultural working machine. This expressly also includes a combination comprising a tractor and at least one machine which is towed or carried by the tractor, such as a trailer. The agricultural machine can in particular be a harvesting machine such as a forage harvester, a combine harvester, a baler or a loader wagon. However, the agricultural machine could also, for example, be a tractor with a tedder, a plough, a fertilizer spreader, a slurry tanker or the like. During field processing, the agricultural machine processes a processing area, for example, an acre, a field or a part thereof, whereby the terms “field” and “acre” are used synonymously for simplification. Field processing, for example, ploughing, fertilizing, mowing, tedding, crop collection or the like, takes place in the processing area, which does not necessarily mean that the entire processing area is processed, although this is desirable.

The method comprises the steps mentioned below, although these need not be performed in the order mentioned. The time sequence of two steps can be reversed compared to the order in which they are mentioned. It is also possible for two steps to be carried out completely or partially parallel in time.

According to one step of the method, a primary area of the processing area is passed through by the agricultural machine under manual control, whereby position data of the agricultural machine are automatically determined. The primary area is a part of the processing area, whereby the term "primary area" is primarily used for differentiation and is not to be interpreted restrictively. The primary area is passed through by the agricultural machine, whereby it can also in particular be processed. The agricultural machine is controlled manually, i.e., by control actions of a user. This may be a driver who rides on the agricultural machine. It can also, however, be someone who controls the agricultural machine remotely. Through manual control, the user provides that the agricultural machine moves within the processing area, and specifically within the primary area. It can conversely also be said that the primary area is defined by the movements of the agricultural machine in this process step. Position data are automatically determined when passing through the primary area. This is generally data that correspond to a position of the agricultural machine. It can be an absolute position (e.g., GPS coordinates) or a relative position in relation to a known reference point. A GNSS receiver can in particular be used to determine the current position of the agricultural machine. The position data are determined automatically, i.e., without human intervention. The position data can also be saved. These and other automatic actions can be carried out by a computer system, some of whose functions can of course be implemented in software. In addition to an area position or spatial position of the agricultural machine, the position data can also contain information about the agricultural machine's orientation, for example, a horizontal angle or azimuthal angle. In addition to the position data, it can be determined whether processing is taking place at a certain position, i.e., whether a processing element of the agricultural machine is active. If processing is taking place when driving through, the primary area can be defined as the entire processed area.

A primary boundary surrounding the primary area is furthermore at least partially determined automatically based on the position data. This means that the position data are used to determine all or part of the boundary of the primary area, which is referred to here as the primary boundary. This is also done automatically, for example, by the aforementioned computer system. In the case of partial determination, only a section of the primary boundary is determined, which is sufficient in some cases. The primary boundary can be derived directly from the position data. However, in particular in the case of processing the primary area, it is useful to take into account the geometry of the agricultural machine, in particular a working width on which the processing element acts on the processing area.

In a further step, a secondary outer boundary of a secondary area located outside the primary area is defined, which meets the primary boundary at two connection points, whereby a part of the primary boundary located between the connection points forms an inner boundary between the primary area and the secondary area, which inner boundary, together with the secondary outer boundary, completely surrounds the secondary area. The secondary outer boundary can be defined by the user or automatically as will be explained below. It is part of a secondary boundary that completely surrounds a secondary area. The secondary outer boundary is always defined so that it is connected to the primary boundary at two connection points, i.e., it coincides with the primary boundary. The primary boundary must be determined in the aforementioned step at least to the extent that this includes the connection points. A part of the primary boundary that lies between the connection points forms an inner boundary. The name comes from the fact that this is located inside the processing area, while the secondary outer boundary (as well as a primary outer boundary of the primary area) limits the processing area to the outside. This means that the secondary area borders on the primary area with the inner boundary, while the secondary area borders on the surroundings of the machining area with the secondary outer boundary. The secondary area is therefore not completely surrounded by the primary area. When driving over the primary area, the secondary area is therefore never completely bypassed. Accordingly, the secondary boundary, i.e., the boundary of the secondary area, cannot be completely determined or defined by driving over the primary area. A part thereof, namely, the secondary outer boundary, is therefore determined specifically in this process step, namely, independently of the position data.

In a further step, which can, for example, be carried out after the above-mentioned steps, a route for processing at least the secondary area is determined automatically. The route is determined automatically, for example, by the above-mentioned computer system, without the need for human thought activity. The route is used at least for processing the secondary area, whereby this need not be processed completely, although it is advantageous to process it as completely as possible. When determining the route, it goes without saying that the secondary boundary, consisting of the inner boundary and the secondary outer boundary, is fully known. This allows a route to be determined that is adapted to the geometry of the secondary area.

In a further process step, control data is automatically generated to control the agricultural machine during field processing, which control data represents the determined route. The control data always contains the information required to control the agricultural machine along the driving route. When working in the field, the agricultural machine can be controlled according to the control data. The term "control" here generally refers to any targeted influencing of the orientation and/or movement status of the agricultural machine, e.g., steering, acceleration, deceleration, etc. The control data can optionally also refer in part to other functions of the agricultural machine, for example, to a control of a lifting device. The agricultural machine can in any case be controlled using the control data so that it ideally follows the determined route. The format of the control data and their content can be selected differently, in particular depending on the respective agricultural machine and any other components used to implement the method. The route can in particular be represented by a more or less dense sequence of waypoints. The control data can also contain explicit steering instructions or only position information for waypoints, whereby the appropriate steering parameters are determined on the part of the agricultural machine in order to move from one waypoint to the next.

The process makes it easier to process an initially unknown processing area. A primary area is first explored to a certain extent by passing there through under manual control. As this does not involve driving completely around the secondary area, however, information about the secondary area, namely, the course of the secondary outer boundary, must be supplemented by other means. The procedure can be advantageous in various scenarios. From a wildlife protection perspective, for example, it may be desirable not to initially drive over and/or process the edge of the processing area completely, but to leave an unprocessed area that can be used by wildlife as a transition to protected areas outside the field. It is also conceivable that a user may wish to partially define the processing area by manually steering the agricultural machine therethrough, whereas the user may consider another definition to be more useful. Defining the secondary outer boundary can in certain circumstances be more time-saving and/or more accurate than, for example, a manually controlled drive-through. The route planning is finally carried out automatically, which saves a user, for example, a driver, complex considerations.

The route can, for example, be planned with regard to the actual characteristics of the agricultural machine that is to carry out the field operation. More specifically, the route can, for example, be determined specifically for the agricultural machine carrying out the field work, taking into account the geometry and/or driving characteristics of the agricultural machine. If during field processing the agricultural machine uses an attachment, which can be removed and replaced by another attachment if necessary, the term "geometry of the agricultural machine" also expressly includes the geometry of the attachment. Possible geometric properties that can be taken into account are the length and width of the agricultural machine, the working width (i.e., the width of the area in which the crop is actually harvested), but also the position of the drive device (wheels, but possibly also caterpillar tracks). The agricultural machine can also be simulated as a polygon, for example, in order to achieve a more realistic representation of the agricultural machine. In combination with a consideration of the geometry, the driving characteristics of the agricultural machine can also usually be taken into account. The driving characteristics can include a possible maximum speed (possibly differentiated between forward and reverse travel), an acceleration and/or braking capacity, a minimum curve radius, a maximum steering angle, a speed of a steering angle change, etc. A distinction can also be made according to the surface on which the agricultural machine is moving, e.g., uphill, flat or downhill, dry or damp, etc. By taking into account at least one of the variables mentioned, it is possible to fully exploit the driving possibilities of the agricultural machine, for example, to use a minimum curve radius, and to avoid planning driving maneuvers that the agricultural machine in question cannot perform.

It is possible that exactly one route is determined according to a fixed scheme, for which control data is then generated. Due to the large number of different processing areas and possible other variables, a route thereby determined will not (or at best randomly) represent the best possible route regardless of how the "quality" of the route is assessed. In order to achieve an improvement in this respect, an automatic optimization of the driving route can, for example, be carried out by determining an optimal driving route from a plurality of possible driving routes according to an optimization criterion and automatically generating control data representing the optimal driving route. This means that a plurality of possible driving routes are considered, which to a certain extent represent candidates for an optimal driving route, and an optimization criterion for optimizing the driving route is used to determine which of these driving routes is optimal. The term "optimal route" is to be understood as the best route found according to the optimization criterion. A better route could actually exist under certain circumstances, however, said route was not found, for example, because not enough different routes were examined. The optimization is automatic, i.e., computer-aided. Insofar as the term "automatic" is used here and in the following, this in particular includes the possibility that the corresponding processes are carried out in whole or in part by software that is implemented on suitable hardware. This step and further steps of the method can be carried out, for example, by a farm management information system (FMIS).

The optimization criterion can, for example, be based at least partially on an optimization of an optimization value which is determined by summing up the contributions of individual route sections of a driving route. The optimization value can in many cases also be referred to as an effort value or cost value, whereby the optimization of the optimization value then lies in a minimization. It is also conceivable, however, that, depending on the type or definition of the optimization value, the optimization lies in maximizing it. In the simplest case, the optimization criterion consists of minimizing (or maximizing) the optimization value. This means that the optimal route is the one that optimizes the optimization value. As will be explained below, however, other variables, for example, other optimization values, could also be taken into account so that the optimization of one optimization value competes with other objectives. The optimization value is in any case determined by adding up the contributions of individual route sections of a route. The optimization value W can be calculated as follows:

$$W=\Sigma_j W_j$$

where $W_j$ represents the contribution of the j-th route section and the sum over j runs over all route sections.

In any automatic optimization, different methods can be used to find the optimal solution or to search for the optimal solution, in particular metaheuristic methods such as simulated annealing or genetic or evolutionary algorithms.

In an embodiment of the present invention, the optimization criterion is based at least partially on minimizing a driving distance. "At least partially" in this context means that the minimization of the driving distance need not be the only objective, but that other values should also be minimized or maximized so that, for example, a compromise is produced that may differ from a sole minimization of the driving distance. It may in particular be intended to minimize the total distance travelled on the route. It may alternatively also be possible to minimize the total distance required for turning routes. The latter can be regarded as an "unproductive" driving distance.

The optimization criterion can alternatively or additionally be based at least partially on minimizing a travel time. This can be based on the travel time for the entire route. The total travel time required for all lane changes and/or turns can, however, also be considered, which in turn represents an "unproductive" travel time. For various reasons, minimizing the travel time is not necessarily the same as minimizing the travel distance. For example, it could be that the processing area has a gradient which means that lanes in one direction can be traveled through more quickly than in the opposite direction. The total number and individual length of the lanes traveled "downhill" or "uphill" can differ for routes of the same length and therefore also the total travel time required for the lanes.

The optimization criterion can alternatively or additionally be based at least in part on minimizing energy consumption. The expected energy consumption for the entire route is here normally considered. This depends on the entire route, but possibly also on other parameters. The energy consumption can, for example, also depend on the alignment of individual lanes if the agricultural machine must cope with a more or less steep incline. The number and individual length of the total "downhill" or "uphill" lanes can also differ.

The optimization criterion can alternatively or additionally also be based at least partially on minimizing an unprocessed area. This can also be referred to as maximizing the coverage. This means that as much of the processing area as possible, ideally 100%, should actually be processed. A distinction could here also be made between an unprocessed area in the inner area and an unprocessed area in the headland. In general, there may be a conflict between minimizing the unprocessed area and minimizing travel time, distance and/or energy consumption, so that it may make sense to include the processed area in order to avoid, for example, achieving a low travel time at the expense of insufficient coverage.

Another possibility is that the optimization criterion is at least partially based on minimizing areas that are driven over several times. Passing over an area several times can increase soil compaction, which is undesirable, and can also mean that crops lying on the ground are driven over and become soiled, damaged or even pressed into the soil. Multiple passes may also indicate sub-optimal efficiency because a single pass is sufficient for processing.

The optimization criterion can under certain circumstances consist of minimizing or maximizing a single variable or a single optimization value, for example, minimizing the total distance travelled. Depending on the nature of the processing area, the type of field work to be carried out, the performance data of the agricultural machine, and other factors, the minimization or maximization of one optimization value may compete to a certain extent with the equally desirable minimization or maximization of another optimization value. The isolated optimization of a single optimization value is in this case often not a satisfactory solution. One embodiment of the present invention therefore provides for the optimization criterion to be based on the optimization of a weighted combination of optimization values. One optimization value could, for example, be the unprocessed area, while another optimization value could, for example, be the travel time. The optimization criterion could then be the minimization of a sum, whereby one summand is proportional to the travel time and another summand is proportional to the unprocessed area. The relative weight of the respective optimization value can be adjusted by selecting suitable weighting factors or normalization factors. The sum can also be regarded as the "total optimization value" $W_{total}$, which is defined as follows:

$$W_{total}=\Sigma_k \alpha_k W_k$$

where $W_k$ denotes the k-th optimization value, for example, the distance, travel time, etc. and ax is the respective weighting factor.

The optimization criterion can alternatively be based on a Pareto optimization of several optimization values. This means that, within an examined parameter range, a parameter set is sought that optimizes the optimization values to the extent that no other parameter set improves one of the optimization values without worsening another. A route could, for example, represent a Pareto optimum in terms of travel time and distance if no other route delivers a shorter travel time without delivering a longer travel distance, and no other route delivers a shorter travel distance without delivering a longer travel time.

In an embodiment of the method of the present invention, an inner area of the processing area is defined as well as a headland, which is arranged on the outside of the inner area, whereby the route is determined so that the inner area is worked after the headland. Both the inner area and the headland are part of the processing area and must therefore be processed by the agricultural machine. The inner area can, for example, make up the majority of the area of the processing area. The inner area can, for example, be passed through by a plurality of parallel tracks, which can, for example, be straight and can be characterized by an alignment or working direction. Turning paths in the headland, which is located at the edge of the inner area, are used to change between two lanes. The headland is located at the edge and can be partially limited by the primary outer boundary. It can be continuous or have a number of separate partial areas. It can be arranged all the way around the inner area or it can leave out part of the outer boundary. This can be useful, for example, to leave at least one refuge edge or a refuge margin open for game. The inner area and the headland can be defined by the user or they can be defined automatically. As the headland is to be used for turning operations when processing the inner area, the route is determined so that the inner area is processed after the headland. This includes the possibility that the headland has already been processed at the start of route planning.

In the above-mentioned configuration, a route, both in the headland and in the interior area, can be characterized by a number of variation parameters which are varied as part of an optimization process in order to find the optimum route. It makes sense to limit the number of variation parameters in order to keep the computational effort within acceptable limits. The available computing capacity naturally here plays a role. Limiting the variation parameters also means that, from the outset, certain assumptions are made about the basic characteristics of an optimal route. One advantageous assumption is that the route has a number of parallel lanes in the inner area. In this context, a track, which could also be referred to as a working track, corresponds to a part of the route of the agricultural machine in the inner area so that the entire or at least predominant area of the inner area is gradually processed by driving along individual tracks. The tracks run parallel, i.e., the distance between two adjacent tracks is constant over their entire length. However, in addition to the tracks within the processing area, the route also includes turning paths within the headland when the agricultural machine changes from one track to another.

If it is determined a priori that all lanes in the inner area are parallel, they can be characterized in their entirety by three parameters: the alignment, the positioning, and the sequence. In the case of straight lanes, the alignment corresponds to a horizontal angle or azimuthal angle; one could also say a cardinal direction, in which all lanes run. The alignment does not, however, determine the positions of the individual lanes. This is done by the positioning. One possibility is that the positioning for each lane contains two-dimensional coordinates of a point through which the respective lane runs. The arrangement of the lane is thus completely defined together with the alignment. As a rule, however, the distance or lateral offset between neighboring lanes is identical for all lanes and corresponds to a lane width. The lane width could, within certain limits, also be varied and thus represent a further variation parameter. The positions of all lanes can otherwise be defined by a single point of a lane, knowing the lane width, whose two-dimensional coordinates can be used to express the positioning. Finally, the route can be characterized by the order in which the lanes (spatially defined by alignment and positioning) are passed through. This allows different driving strategies to be represented, for example, the agricultural machine changing from one lane to the next lane or to the next but one, via the next but one, etc. In case of irregularly shaped processing areas, for example, it may also make sense for a change to the next lane to take place in one section, while a change to the next but one lane takes place in another section, or similar. With regard to the amount of data, the sequence of N lanes can be expressed by an N-tuple, for example an N-dimensional vector.

Different strategies are possible if the three parameters mentioned are varied. Optimization can, for example, be performed in stages. At the lowest optimization level, two parameters can be kept constant (e.g., positioning and alignment), while the third parameter (e.g., the sequence) is varied. At a middle optimization level, one parameter (e.g., positioning) is kept constant, while the second parameter (e.g., alignment) is varied and the optimum value determined at the lowest optimization level is used for the third parameter. At an upper optimization level, one parameter (e.g., positioning) is varied, while the optimum values found at the middle and lower optimization levels are used for the second and third parameters. It is alternatively also possible for two parameters (e.g., alignment and positioning) to be treated as equal variation parameters at an upper optimization level so that routes that may differ in two parameters are compared. In a lower optimization level, the third parameter (e.g., the sequence) is varied. In some cases, parallel lanes can also be assumed for processing the headland, whereby their alignment can be based on the boundary of the processing area. A wide variety of steering processes are, however, conceivable, particularly when processing the headland, in particular in corner areas of the headland. The offset of two parallel tracks in the headland can also be a useful variation parameter.

One possible procedure is to carry out manually controlled driving exclusively in an area intended for the headland. The headland can thereby be driven over (and, if necessary, processed) in whole or in part under manual control. The rest of the headland, if necessary, and the inner area can then be processed on the basis of the automatically determined route. In an embodiment of the present invention, the headland is accordingly defined so that the primary area is completely located within it. This means that the primary area forms the headland or part of the headland. Conversely, the inner area is arranged completely in the secondary area and may be congruent therewith.

The secondary area is always taken into account when planning the route so that it can be completely or at least predominantly processed. This is also sufficient and efficient as long as the primary area has also been processed during the journey. This is certainly an advantageous procedure, but it is not essential. An embodiment of the present invention therefore provides that if it is determined that the primary area was at most partially processed when driving through it, the route for processing the primary area and the secondary area is determined. This means that the processing of the primary area that was only partially processed or not processed at all is made up for or continued as part of the route. The route can, for example, be determined so that the primary area is at least predominantly processed. Such a route may require that already processed parts of the primary area are passed through again in order to reach or leave unprocessed parts.

The secondary outer boundary can be determined fully or partially automatically, for example, by the above-mentioned computer system. In this sense, "automatic" means that the decisive processes are not carried out by human thought, but by a machine. Some of the following possibilities can be combined with each other, either by providing the reliability of the determination by two independent methods, or by determining part of the secondary outer boundary by one method and another part by a different method.

An embodiment of the present invention provides for the secondary outer boundary to be automatically determined as a straight line between end points of a concave section of the primary boundary, with the end points forming the connection points. The primary boundary, or at least the determined part thereof, has a concave section, one could also say a receding section. This section is concave overall from outside the primary area. It is bounded by end points. "Concave" in this context is to be understood as the opposite of "convex" in the sense that a connecting line between points of the concave section lies at least partially outside the primary area. The concave section can accordingly have convex or protruding subsections. The concave section and its end points are in any case selected so that the straight line between the end points lies completely outside the primary area. This straight line is defined as the secondary outer boundary. In other words, it is assumed that the primary area surrounds or partially surrounds the secondary area and that the secondary outer boundary is a straight line. The latter is in reality a realistic assumption for many parcels. This embodiment is particularly suitable if one side of a field is to remain unworked during a manually controlled driving in order to keep an escape route open for game. The primary area can have a U-shape as a headland or part of a headland, within which the secondary area is accommodated to a certain extent.

In an embodiment of the present invention, the secondary outer boundary can, for example, be determined automatically at least in part using stored geographical data of an area surrounding the primary area. The "geographical data" can, for example, correspond to a satellite photo showing the surroundings of the primary area, whereby the primary area itself can also be recorded. Using a satellite photo, for example, the boundaries of a parcel of land could be recognized via image recognition. If this is combined with information about the parcel in which the primary area is located, the secondary outer boundary can be derived therefrom. The geographical data can also be taken from a map, for example, a parcel map. Even if parcel boundaries are in principle drawn in such a map, the primary area must still be automatically assigned to a parcel and the boundary areas of the parcel that form the secondary outer boundary must be automatically recognized.

In an embodiment, the present invention provides for a sensory examination of the surroundings of the primary area to be carried out, with the secondary outer boundary being determined at least partially automatically on the basis of the examination. The sensory inspection can, for example, be based on non-contact sensors, for example, optical sensors such as at least one camera. Such a camera could be arranged on an airborne drone controlled by the agricultural machine so that an overview of the surroundings is possible within a short time. The sensor data obtained can be used to create an image of the surroundings within which structures representing the secondary outer boundary can then be recognized (for example, via image recognition). A crop boundary can, for example, be detected or a soil coloration and/or structure can be identified within the processing area on which basis a boundary to neighboring areas can be identified.

In order to be able to correct possible errors in the automatic determination and to better integrate the user into the automatic processes, an embodiment of the present invention provides that the automatically determined secondary outer boundary can, for example, be determined after confirmation by a user. This means that the computer system is not able or authorized to determine the automatically determined secondary outer boundary, but that a user confirmation is required therefor. The user can enter the confirmation via a suitable interface (e.g., a mouse, keyboard, touch screen, microphone, etc.). If the user refuses to confirm, the user can be given the option of correcting the determined secondary outer boundary or starting a new automatic determination.

It is also possible for the secondary outer boundary to be set at least partially by the user. A user input can, for example, be provided in this case. The user can, for example, define the boundary so that the user is shown a representation of the surroundings on a screen, for example, a satellite image or a field map. The primary area and/or the determined primary boundary can, for example, also be displayed. The user can then use an interface (for example, a mouse, keyboard, touch screen, etc.) to define the secondary outer boundary, for example, by specifying individual points of the secondary outer boundary that are automatically connected. A user definition can also consist of a correction of an automatically determined secondary outer boundary.

The position data can optionally be used to automatically determine a primary outer boundary of the primary area which, together with the secondary outer boundary of the secondary area, completely encloses the machining area. The primary outer boundary is the part of the primary boundary that does not form the inner boundary. It is not adjacent to the secondary area and is to a certain extent turned away therefrom. Together with the secondary outer boundary, the primary outer boundary forms an overall outer boundary of the machining area. It also completely encloses the primary area together with the inner boundary. If processing has taken place during access to the primary area, the primary outer boundary can be determined by identifying which area has been processed. This results in the primary boundary and thus, knowing the inner boundary, also knowing the primary outer boundary. If no processing has taken place, the primary boundary that would have resulted from the same position data with an active processing element can, for example, be used as a basis. The automatically determined primary outer boundary can be checked and confirmed or rejected by the user. Determining the primary outer boundary is important if the primary area has not yet been fully processed. Even if this is the case, however, the primary outer boundary and/or the resulting total outer boundary can be saved for future use so that the geometry of the processing area is known from the outset in the event of further processing, for example, by another agricultural machine.

It is conceivable that the agricultural machine has a computer system (i.e., an evaluation and/or calculation unit) that is able to determine the optimum route based on sufficient information about the processing area and possible refuge areas. In many cases, however, it is more efficient if the route is determined externally for the agricultural machine and the control data are generated externally and transmitted to the agricultural machine. The route is then determined and the control data are generated via a central system, in particular a central evaluation unit, which can even be housed in a stationary building that need not be close to the processing area. Wireless communication could be used to transmit the generated control data to the agricultural machine, which then uses the generated control data to follow the route. Due to the centralized, external processing, only a few resources are required on the part of the agricultural machine in terms of computing capacity and storage space.

Control data can be generated for an autonomously driving agricultural machine which carries out the field processing autonomously based on the control data. This means that if the control data are available to this agricultural machine, the agricultural machine can follow the determined route and carry out the associated field processing without human intervention. The agricultural machine can use various internal and/or external sensors for navigation, whereby at least some of the same sensors can be used for recording the position data during a manually controlled travel over the primary area. The agricultural machine can use the sensor data to determine its current actual position and compare it with a target position corresponding to the optimum route.

Control data can also be generated for an agricultural machine controlled by a driver so that control instructions can be generated for the driver based on the control data. The control data can be available within the agricultural machine and converted into control instructions. It would also alternatively be conceivable using the control data for control instructions to be generated externally and transmitted to the agricultural machine. It is also conceivable that one and the same agricultural machine is steered autonomously at times and by a driver at other times. The control instructions can be issued visually and/or acoustically. The control instructions could explicitly indicate to the driver how to steer the agricultural machine, or a target driving line could be displayed on a screen, for example, which the driver can use for orientation.

The present invention also provides a computer system for route planning for field processing in which a processing area is processed by the agricultural machine, if a primary area of the processing area has been passed through by the agricultural machine under manual control, position data of the agricultural machine having been automatically determined, the computer system is set up for:

- automatically determining a primary boundary at least partially surrounding the primary area based on the position data, and
- if a secondary outer boundary of a secondary area, which is arranged outside the primary area and meets the primary boundary at two connection points, has been defined, a part of the primary boundary lying between the connection points forming an inner boundary between the primary area and the secondary area, which, together with the secondary outer boundary, completely surrounds the secondary area, the computer system is set up for:
  - automatically determining a route for processing at least the secondary area, and
  - automatically generating control data for controlling the agricultural machine during field processing, whereby the control data represent a determined driving route.

The aforementioned terms have already been explained above with reference to the method according to the present invention and will therefore not be explained again. The computer system has at least one computer, i.e., a processor, in particular a data processing unit. It may, however, also have other components, for example, wireless and/or wired interfaces for one-way or two-way communication with other devices. The computer system can, for example, be set up to automatically record the position data and/or determine the secondary outer boundary. Further advantageous embodiments of the computer system according to the present invention correspond to those of the method according to the present invention.

The computer system can in particular be a farm management information system that is located outside the agricultural machine, for example, stationary inside a building. The computer system could also be located in a mobile unit (laptop, tablet, smartphone, etc.), which displays control instructions for the driver or transmits control data (usually wirelessly) to the agricultural machine. More generally, the computer system can be external to the agricultural machine and can be set up to generate the control data for transmission to the agricultural machine. The computer system may have an interface for transmitting data to the agricultural machine and may be adapted to transmit the control data (wired or wireless) to the agricultural machine.

The computer system can alternatively be integrated into an agricultural machine, i.e., it can be part of the agricultural machine and be arranged within it. The computer system may in either case be partially realized by software. Irrespective of whether the computer system is part of the agricultural machine or not, the computer system can be set up to control the agricultural machine in accordance with the control data.

The present invention also provides an agricultural machine comprising a computer system for driving route planning for a field processing in which a processing area is processed by the agricultural machine, if a primary area of the processing area has been passed through by the agricultural machine under manual control, position data of the agricultural machine having been automatically determined, the computer system is arranged to:

- automatically determine at least partially a primary boundary surrounding the primary area based on the position data, and
- if a secondary outer boundary of a secondary area, which is arranged outside the primary area and meets the primary boundary at two connection points, has been defined, a part of the primary boundary lying between the connection points forming an inner boundary between the primary area and the secondary area, which, together with the secondary outer boundary, completely surrounds the secondary area, the computer system is arranged to:
  - automatically determine a route for processing at least the secondary area, and
  - automatically generate control data for controlling the agricultural machine during field processing, whereby the control data represents a determined route.

The computer system can, for example, be set up for automatically detecting the position data and/or determining the secondary outer boundary. Embodiments of the agricultural machine according to the present invention correspond to those of the method according to the present invention.

The present invention further provides a computer program product comprising program code means which enable a computer system to perform the steps described above. The computer program product thus includes software that implements the aforementioned steps on the hardware of the computer system. It can be in the form of a data carrier on which the software, i.e., the program code means (volatile or non-volatile), is stored. The data carrier can also be permanently integrated and/or integrable into the computer system.

The present invention is described below with reference to drawings. The drawings are merely exemplary and do not limit the general idea of the present invention.

FIG. 1 shows a top view of a processing area 20, i.e., a field adjacent to a refuge area 30, for example, a woodland. An agricultural machine 10, for example, a combine harvester, and a computer system 1 for route planning according to the present invention, which in this case is arranged outside the agricultural machine 10, for example, in a building which may be far away from the processing area 20, are shown in highly schematized form. The computer system 1 can be formed by a farm management information system or represent a part thereof. It has an interface (not here individually shown) for wireless data transmission to the agricultural machine 10. It is intended that the agricultural machine 10 performs a field processing in the processing area 20, for example, mowing grass. The refuge area 30 is regarded as a possible retreat area for game which flees from the processing area 20 when the field processing is being carried out.

The boundaries of the processing area 20 are initially not known to the computer system 1. These boundaries are recorded in two stages. In the first stage, the agricultural machine 10 passes through a primary area 23 and processes the primary area 23. This means that the crop shown hatched in the drawings is harvested in the primary area 23. Processing takes place on the edge of the crop, whereby a refuge edge 28 adjacent to the refuge area 30 is left out. During this process, position data are recorded, for example, via a GNSS receiver within the agricultural machine 10, and are transmitted to the computer system 1. The position data may also include data relating to the orientation of the agricultural machine 10 as well as data indicating whether or not the mower unit was activated in a particular position of the agricultural machine 10. The position data can also be three-dimensional so that, for example, a height profile of the primary area 23 can be recorded. By linking with data describing the geometry of the agricultural machine 10, the shape of the primary area 23 being processed can be determined with good accuracy. The computer system 1 now automatically determines a primary boundary $G_1$ of the primary area 23, recognizing that the primary boundary $G_1$ has a concave section K. Assuming that the area within belongs to the processing area 20, a secondary area 24 is defined by selecting the end points of the concave area K as connection points $P_A$ and selecting a straight line between these connection points $P_A$ as the secondary outer boundary $A_2$ of the secondary area 24. This automatic determination by the computer system 1 can be confirmed or rejected by a user. Once the secondary outer boundary $A_2$ has been determined, the primary boundary $G_1$ can be divided into a primary outer boundary $A_1$ and an inner boundary I located between the connection points $P_A$. The inner boundary I is located between the primary area 23 and the secondary area 24, while the primary outer boundary $A_1$ and the secondary outer boundary $A_2$ together completely surround the processing area 20.

An optimum route $F_{opt}$ is to be determined for the now fully defined processing area 20 which represents the best possible processing strategy for the previously unprocessed areas. The corresponding planning and optimization is carried out automatically by the computer system 1. In order to be able to carry out a realistic planning, the computer system 1 has data relating to the geometry of the agricultural machine 10, in particular its effective working width, as well as its driving characteristics, for example, its maximum speed in forward and reverse travel, its minimum turning radius, etc. The performance data of the agricultural machine 10 can also be known as a function of the ground conditions, gradient or other factors, for example, a speed dependent thereon, a fuel consumption or the like.

An optimization criterion is defined for the optimization. This can be, for example, the minimization of an entire driving distance, the minimization of an entire driving time, the minimization of fuel consumption, the minimization of an unprocessed area or similar. It is also possible that several sub-criteria are defined, between which a certain competition may exist. The object can be to minimize a weighted combination of different optimization values (e.g., driving distance, driving time, etc.), while a Pareto optimization can also be carried out with regard to different optimization values.

An inner area 21 and a headland 22 are defined within the processing area 20. The headland 22 is arranged in a U-shape at the edge of the inner area 21, leaving out the refuge edge 28. The subdivision into inner area 21 and headland 22 can be determined by the user or automatically by the computer system 1.

Figure 2:
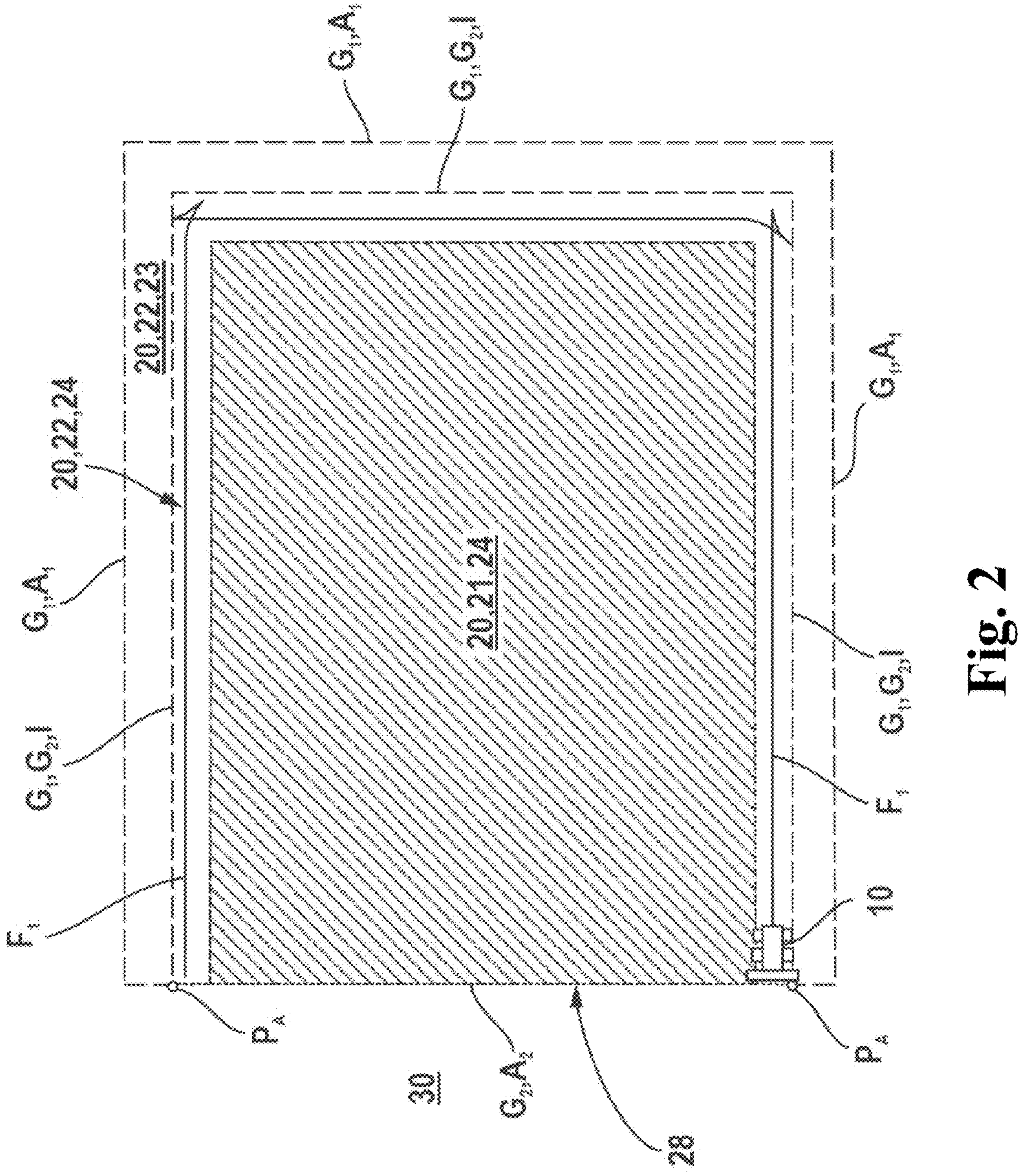
FIG. 2 shows a top view of the processing area from FIG. 1 with the agricultural machine during a second phase of the method according to the present invention.
Figure 3:
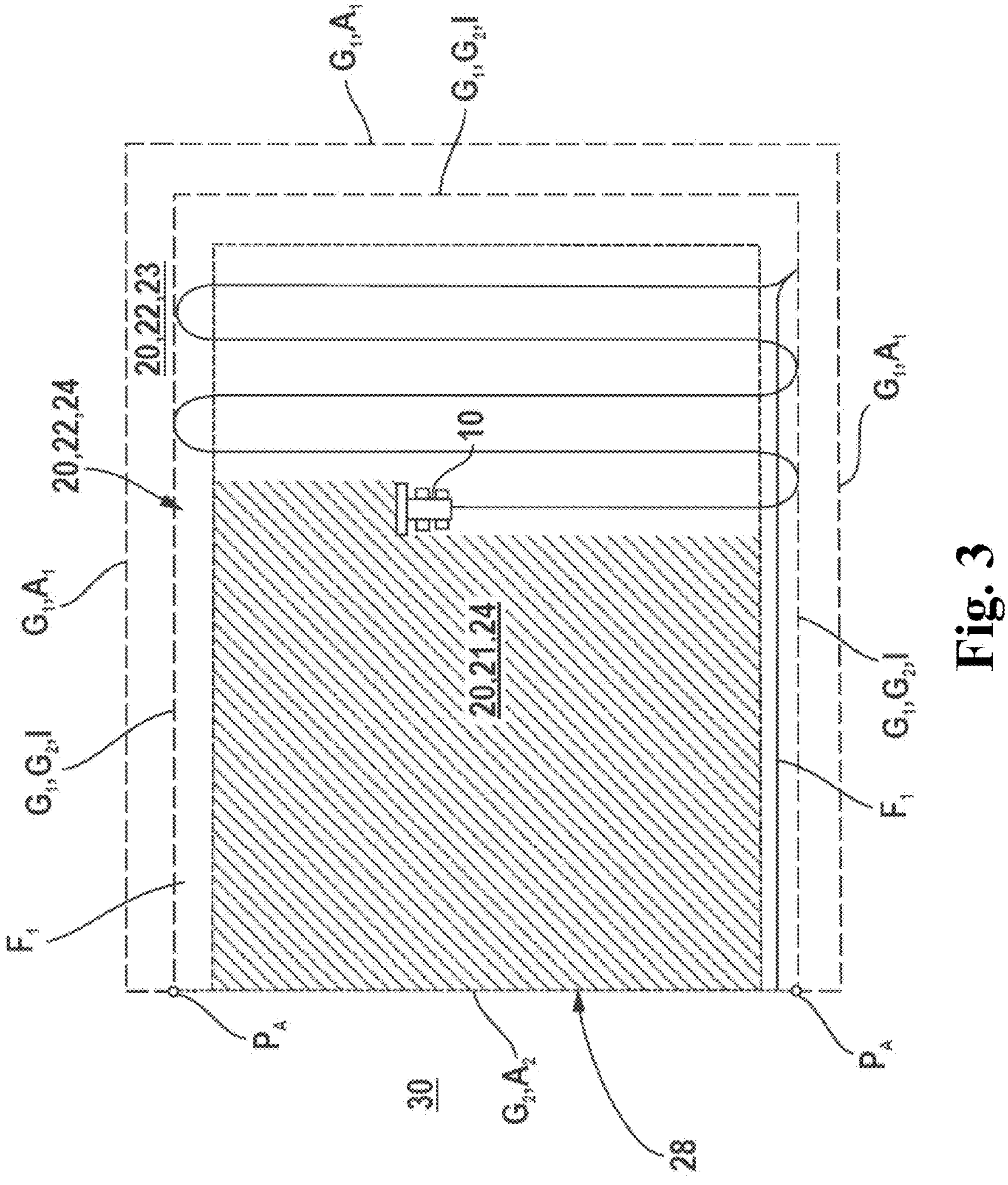
FIG. 3 shows a top view of the processing area from FIG. 1 with the agricultural machine during a second phase of the method according to the present invention.

The respective driving route $F_1$-$F_3$ is defined so that the inner area 21 is processed after the headland 22. FIG. 2 shows a state in which the agricultural machine 10 has completely processed the headland 22, while the inner area 21 is still completely unprocessed. As shown in FIG. 3, the inner area is then harvested in a plurality of parallel tracks, whereby the tracks are connected by turning paths in the headland 22. The processing is here carried out so that it starts at an end of the inner area 21 opposite the refuge edge 28.

The computer system 1 determines a plurality of possible driving routes $F_1$-$F_3$ and uses these to determine the optimum route $F_{opt}$ according to the optimization criterion. Control data D are then generated that corresponds to the optimum route $F_{opt}$ and are transmitted to the agricultural machine 10.

Figure 4:
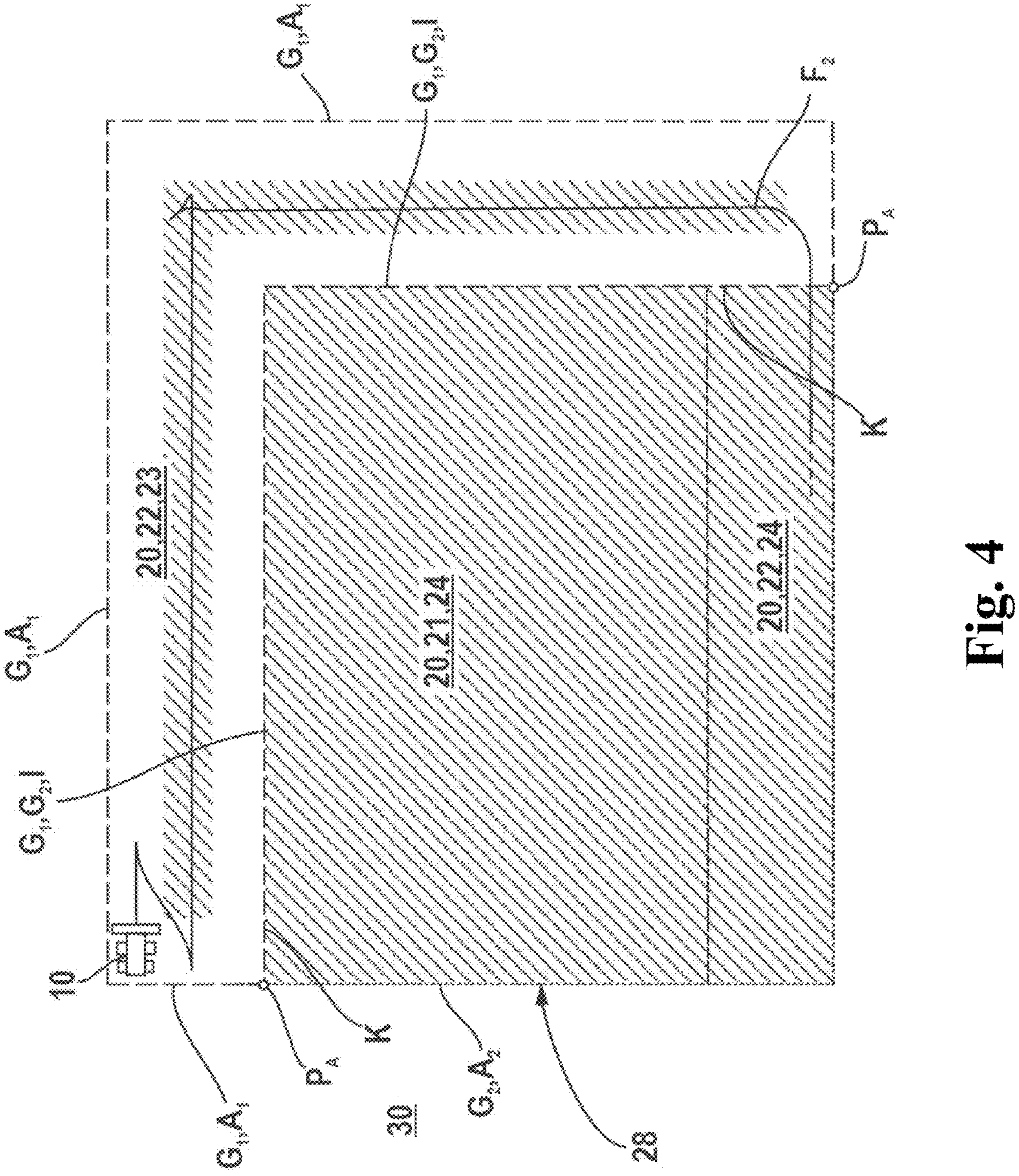
FIG. 4 shows a top view of a second processing area and of an agricultural machine during a first phase of a method according to the present invention.

FIG. 4 shows a further exemplary embodiment in which the primary area 23 is L-shaped. The primary area 23 has also not yet been fully harvested. Due to the L-shape, defining the secondary outer boundary $A_2$ as a straight line between the connection points $P_A$ would lead to an incorrect result. In this case, the computer system 1 can, for example, access geographical data such as a satellite photo and use image recognition to identify the boundaries of the processing area 20. Knowing the primary boundary $G_1$, the secondary outer boundary $A_2$ thereof can be determined automatically. The automatic determination can in turn be confirmed or rejected by the user. Another option could be to carry out a sensory inspection of the surroundings of the primary area 23. This could be done, for example, by an airworthy drone (not shown) with a camera. Based on the sensory inspection, the boundary of the processing area 20 could in turn be identified via image recognition and the secondary outer boundary $A_2$ could be determined on this basis. Another possibility is that the secondary outer boundary $A_2$ is determined entirely by user input. For this purpose, the user could, for example, be shown a satellite photo in which the primary boundary $G_1$ of the primary area 23 is marked. The user can define the course of the secondary outer boundary $A_2$ via a suitable interface, for example, a touchscreen.

The primary area 23 has not yet been fully processed in the example shown in FIG. 4. A second driving route $F_2$ is therefore determined to provide for a processing of the primary area 23 and the secondary area 24.

Figure 5:
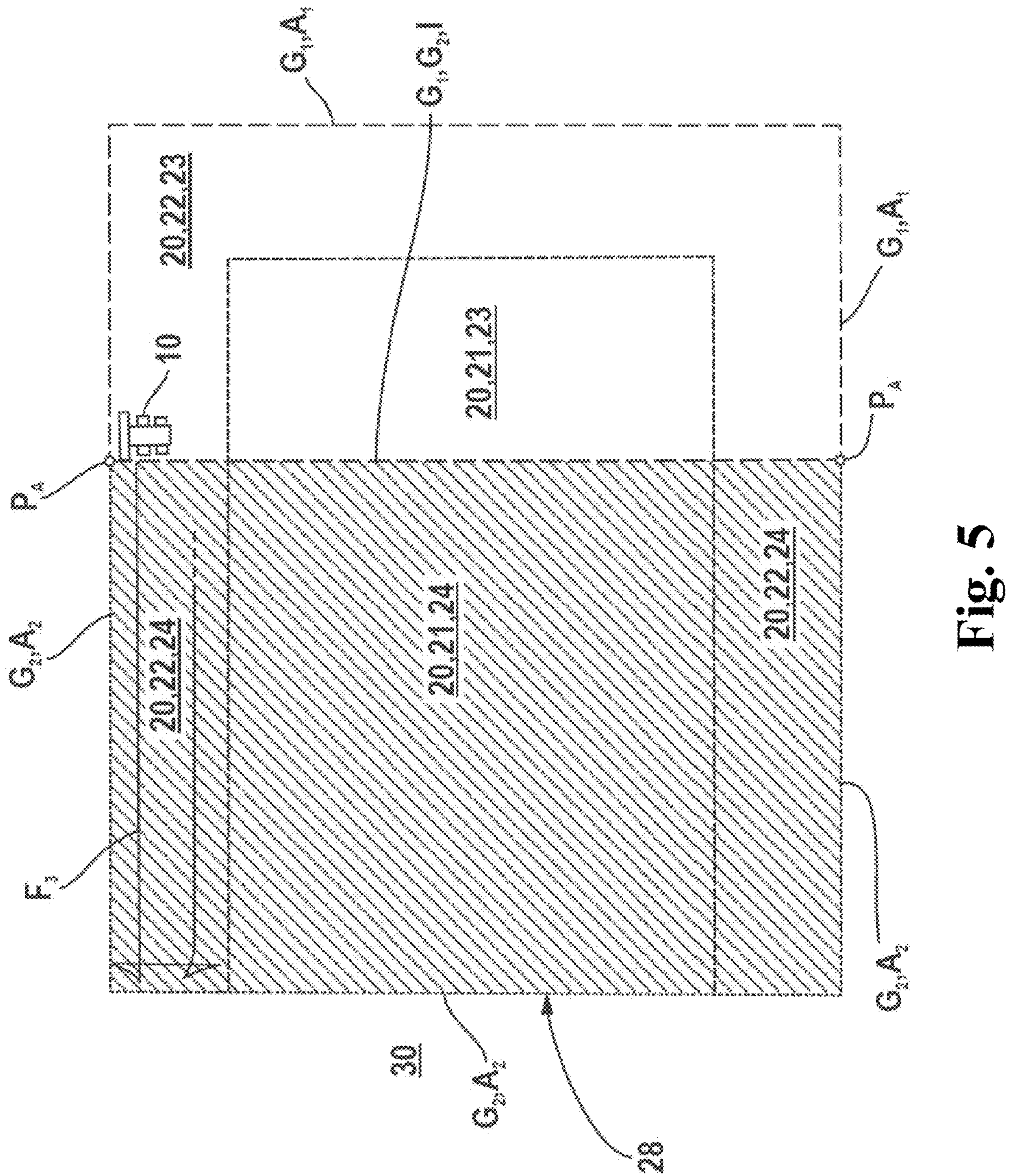
FIG. 5 shows a top view of a third processing area and of an agricultural machine during a first phase of a method according to the present invention.

FIG. 5 shows a third example with a rectangular primary area 23. There is no concave area of the primary boundary $G_1$ in this case. The secondary outer boundary $A_2$ can again be determined and defined by one of the methods described with reference to FIG. 4. The inner area 21 and the headland 22 are then again determined. In contrast to the first two examples, the primary area 23 is in this case not completely located in the headland 22, but also extends to the inner area 21. A partially illustrated third driving route $F_3$ is planned so that the remaining parts of the headland 22 are processed first and only then the remaining inner area 21 is processed.

Figure 6:
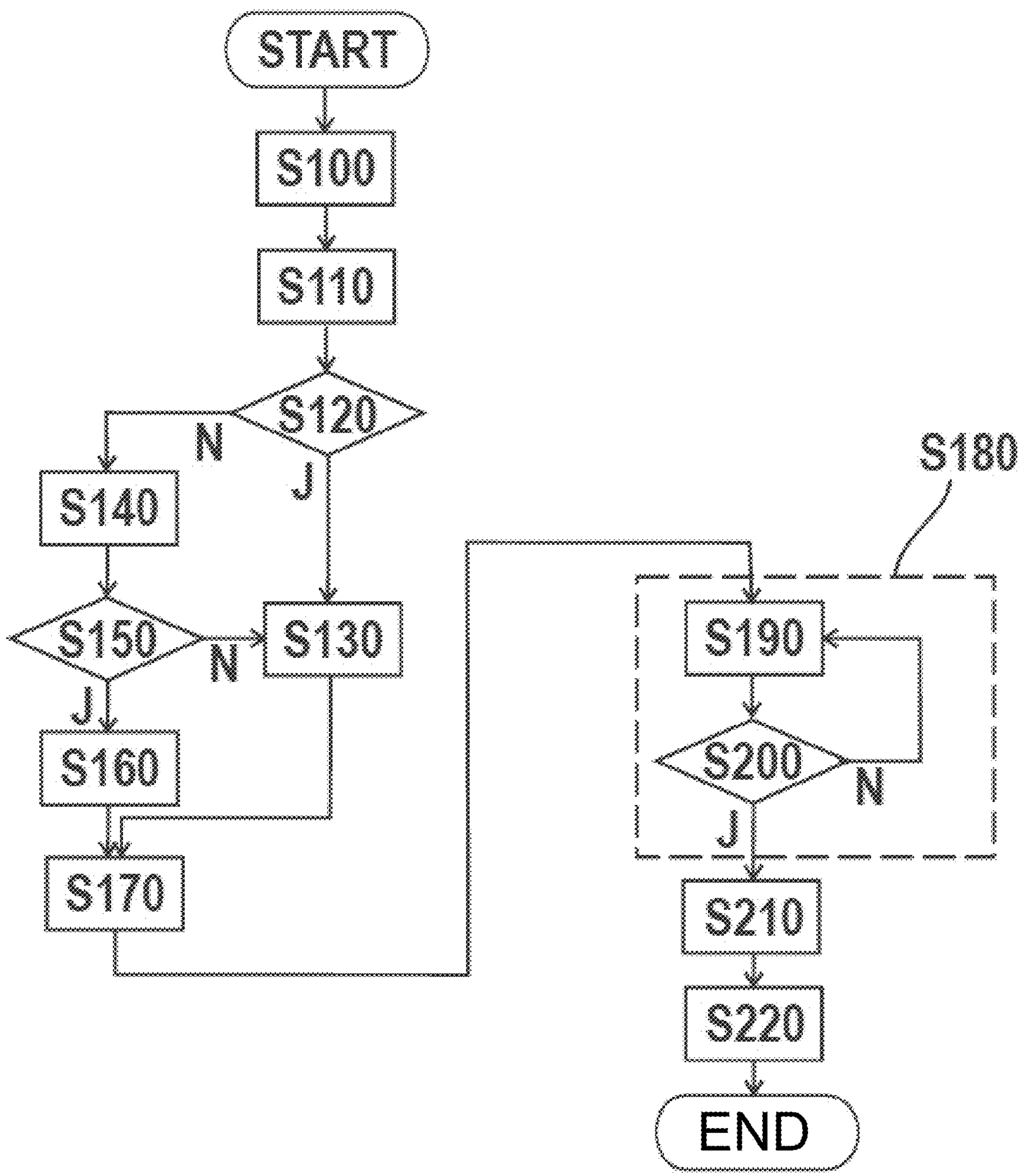
FIG. 6 shows a flow chart of a method for route planning according to the present invention.

The sequence of a method according to the present invention for route planning, or more precisely, for route optimization, is now described with reference to the flow diagram in FIG. 6. In a first step S100, the primary area 23 is passed through, whereby the agricultural machine 10 is manually controlled and position data is determined. In a next step S110, the computer system 1 uses the position data to determine the primary boundary $G_1$. In the next step S120, the system checks whether the user wishes to set the secondary outer boundary $A_2$ manually. If yes, the user defines it in step S130. If not, the secondary outer boundary $A_2$ is determined automatically in step S140 using one of the methods described above. In step S150, a query is made as to whether the user confirms the secondary outer boundary $A_2$ determined in this way. If not, the procedure is continued with step S130. If the user confirms, the automatically determined secondary outer boundary is determined in step S160. In step S170, the inner area 21 and the headland 22 are defined. The actual route optimization follows at S180. In step S190, a driving route $F_1$-$F_3$ is determined or planned. Step S200 checks whether the optimum route $F_{opt}$ has already been found, which is usually not the case for the first driving route $F_1$, so that the process returns to step S190, where a further route is planned.

In general, different parameters can be varied for the individual driving routes $F_1$-$F_3$, for example, the positioning, alignment and sequence of the lanes in the inner area 21. While the lanes run parallel to the refuge edge 28 in FIG. 3, a different alignment could also be selected. The positioning could also be changed, which could, for example, mean that the inner area 21 is not completely covered, but fewer lanes are required. Finally, the sequence can be varied.

If it is decided in step S200 that the optimum route $F_{opt}$ has been found, the optimization is complete. The computer system 1 now generates control data D for the agricultural machine 10 in step S210, which corresponds to the optimum route $F_{opt}$. If the agricultural machine 10 is to be controlled by a driver, the control data D can correspond to instructions for the driver, which he can use to steer the agricultural machine 10 along the optimum route $F_{opt}$. If the agricultural machine 10 drives autonomously, the control data D may include explicit driving and/or steering commands for the systems of the agricultural machine 10. In step S220, the control data D are sent wirelessly to the agricultural machine 10, as indicated in FIG. 1.

In order to enable the computer system 1 to carry out the method described, the necessary software can be provided as a computer program product, for example, as a mobile or integrated data carrier, which has program code means or a program code that implements the method on the hardware of the computer system.

According to an alternative (not shown), the computer system 1 can also be integrated into the agricultural machine 10. The control data D are in this case available directly in the agricultural machine 10.

The present invention is not limited to embodiments described herein; reference should be had to the appended claims.

LIST OF REFERENCE CHARACTERS

1 Computer system
10 Agricultural machine
20 Processing area
21 Inner area
22 Headland
23 Primary area
24 Secondary area
28 Refuge edge
30 Refuge area
$A_1$ Primary outer boundary
$A_2$ Secondary outer boundary
D Control data
I Inner boundary
$G_1$ Primary boundary
$G_2$ Secondary boundary
$F_{opt}$ Optimum route
$F_1$ First driving route
$F_2$ Second driving route
$F_3$ Third driving route
K Concave area
$P_A$ Connection point

The invention claimed is:

1. A method for a route planning for a field processing where an agricultural machine processes a processing area, the method comprising:

passing the agricultural machine in a manually controlled manner through a primary area of the processing area while automatically determining position data of the agricultural machine;

automatically determining all or part of a primary boundary which surrounds the primary area based on the position data;

determining a secondary outer boundary of a secondary area, the secondary outer boundary being arranged outside the primary area so as to meet the primary boundary at two connection points, wherein, a part of the primary boundary which lies between the two connection points forms an inner boundary between the primary area and the secondary area, the inner boundary, together with the secondary outer boundary, completely surrounds the secondary area;

automatically determining a driving route for processing at least the secondary area;

automatically generating control data for controlling the agricultural machine during the field processing, the control data representing a determined driving route; and using the control data to control the agricultural machine during the field processing so that the agricultural machine processes the processing area.

2. The method as recited in claim 1, further comprising:

performing an automatic optimization of the driving route by determining an optimum driving route from a plurality of possible driving routes according to an optimization criterion; and automatically generating control data representing the optimum driving route.

3. The method as recited in claim 2, further comprising:

determining an inner area of the processing area and a headland which is arranged on an outside of the inner area, wherein, the driving route is determined so that the inner area is processed after the headland.

4. The method as recited in claim 3, wherein the headland is defined so that the primary area is completely arranged therein.

5. The method as recited in claim 4, further comprising:

determining whether or not the primary area has been partially processed or not processed when passing therethrough; and when the primary area has been partially processed when passing therethrough, determining the driving route for processing the primary area and the secondary area.

6. The method as recited in claim 5, wherein, the secondary outer boundary is automatically determined as a straight line between end points of a concave section of the primary boundary, the end points forming the two connection points, or the secondary outer boundary is automatically determined using stored geographical data of an environment of the primary area, and/or the method further comprises;

performing a sensory examination of surroundings of the primary area, and the secondary outer boundary is automatically determined using the sensory examination.

7. The method as recited in claim 1, wherein the using of the control data to control the agricultural machine during the field processing so that the agricultural machine processes the processing area comprises ploughing, fertilizing, mowing, tedding and/or colleting crops in the processing area.

8. The method as recited in claim 6, further comprising:

confirming the automatically determined secondary outer boundary by a user.

9. The method as recited in claim 6, wherein the secondary outer boundary is determined by a user.

10. The method as recited in claim 1, further comprising:

automatically determining a primary outer boundary of the primary area based on the position data, wherein, the primary outer boundary, together with the secondary outer boundary of the secondary area, completely encloses the processing area.

11. The method as recited in claim 1, wherein, the driving route is determined externally for the agricultural machine, and the control data are generated externally and transmitted to the agricultural machine.

12. The method as recited in claim 1, wherein, the agricultural machine is configured to be driven autonomously, the control data are generated for the agricultural machine which is configured to be driven autonomously, and the agricultural machine which is configured to be driven autonomously is further configured to autonomously perform the field processing based on the control data.

13. The method as recited in claim 1, wherein, the agricultural machine is configured to be steered by a driver, the control data are generated for the agricultural machine which is configured to be steered by the driver, and control instructions for the driver are generated based on the control data.

14. A computer system for a route planning for a field processing where an agricultural machine processes a processing area, wherein, when a primary area of the processing area has been passed through by the agricultural machine under a manual control and position data of the agricultural machine has been automatically determined, the computer system is configured to:

automatically determine all or part of a primary boundary which surrounds the primary area based on the position data; and when a secondary outer boundary of a secondary area, which secondary outer boundary is arranged outside the primary area, has been determined and meets the primary boundary at two connection points, a part of the primary boundary lying between the two connection points thereby forming an inner boundary between the primary area and the secondary area, the inner boundary, together with the secondary outer boundary, completely surrounding the secondary area, the computer system is further configured to:

automatically determine a driving route for processing at least the secondary area, automatically generate control data for controlling the agricultural machine during the field processing, the control data representing a determined driving route, and use the control data to control the agricultural machine during the field processing so that the agricultural machine processes the processing area.

15. An agricultural machine comprising a computer system which is configured to provide a route planning for a field processing where the agricultural machine processes a processing area, wherein, when a primary area of the processing area has been passed through by the agricultural machine in a manually controlled manner, and position data of the agricultural machine has been automatically determined, the computer system is configured to:

automatically determine at least a part of a primary boundary which surrounds the primary area based on the position data; and when a secondary outer boundary of a secondary area, which secondary outer boundary is arranged outside the primary area, has been determined and meets the primary boundary at two connection points, a part of the primary boundary lying between the two connection points thereby forming an inner boundary between the primary area and the secondary area, the inner boundary, together with the secondary outer boundary, completely surrounding the secondary area, the computer system is further configured to:

automatically determine a driving route for processing at least the secondary area, automatically generate control data for controlling the agricultural machine during the field processing, the control data representing a determined driving route, and use the control data to control the agricultural machine during the field processing so that the agricultural machine processes the processing area.

16. A non-transitory computer program product comprising a program code which enables the computer system as recited in claim 14 to, automatically determine all or part of the primary boundary which surrounds the primary area based on the position data, automatically determine the driving route for processing at least the secondary area, and automatically generate the control data for controlling the agricultural machine during the field processing, the control data representing the determined driving route.

* * * * *